United States Patent Office 3,555,398
Patented Jan. 12, 1971

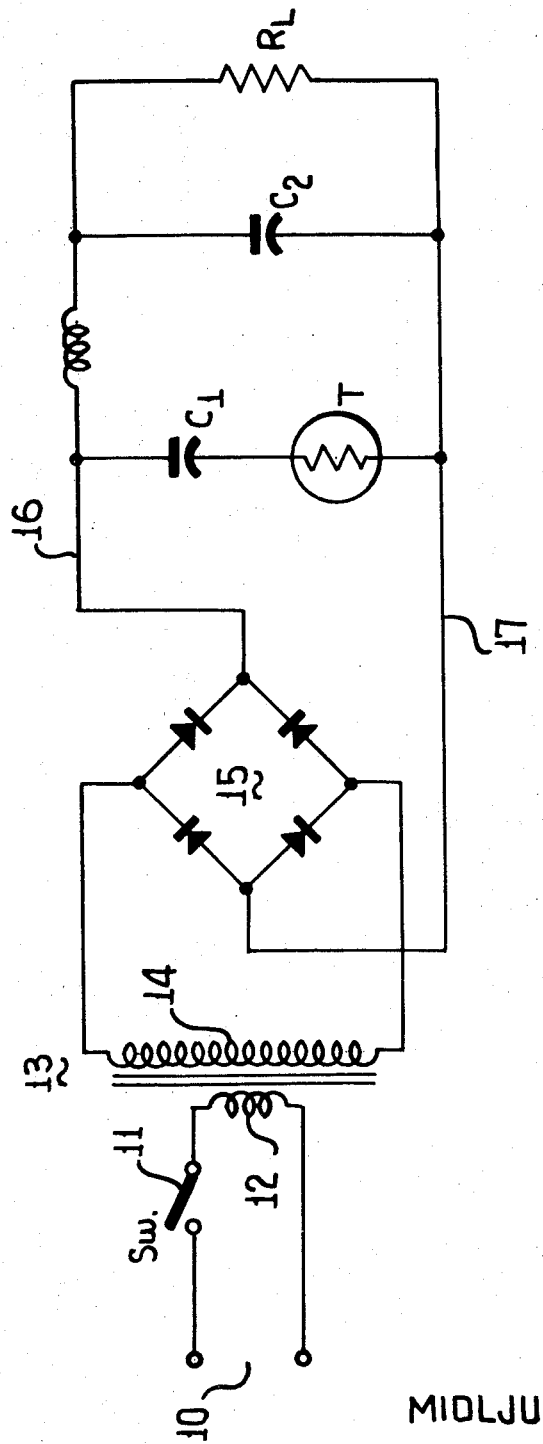

3,555,398
RECTIFIER POWER SUPPLY WITH SURGE REDUCTION
Mioljub R. Nestorovic, Endwell, N.Y., assignor to McIntosh Laboratory, Inc., Binghamton, N.Y., a corporation of Delaware
Filed June 5, 1969, Ser. No. 830,814
Int. Cl. H02m 7/00
U.S. Cl. 321—16        3 Claims

ABSTRACT OF THE DISCLOSURE

A rectifier power supply which reduces initial surge and also improves regulation over a wide range of load currents, consisting of a capacitor and a thermistor connected directly across the rectifier of the power supply on the output side of the rectifier.

BACKGROUND OF THE INVENTION

It is known to connect a thermistor in series with the primary winding of the power transformer of an amplifier, in order to reduce surge current during turn on. This technique reduces voltage regulation because the thermistor varies its resistance as a function of load. Nevertheless, some device for surge reduction is needed, because otherwise transient peaks in the order of 500 amperes can be achieved in high power audio amplifiers.

Surge reduction can be achieved in various ways, but these deteriorate voltage regulation. The present invention pertains to a surge reduction circuit device which serves to improve voltage regulation over a wide range of load currents.

SUMMARY OF THE INVENTION

A rectifier power supply having improved regulation from maximum to minimum load, by inclusion of a thermistor in series with the shunt filter capacitor of the supply. In addition, the presence of the thermistor reduces surge current on initial energization of the supply, by a factor of about ten.

BRIEF DESCRIPTION OF THE DRAWING

The single figure is a schematic circuit diagram of a power supply according to the invention.

DESCRIPTION OF THE PREFERRED EMBODIMENT

In the drawing, 10 are AC power terminals and 11 is a power switch which connects the terminals 10 to the primary winding 12 of a power transformer 13. The secondary winding 14 is connected to input terminals of diode rectifier 15, of conventional character, and the output terminals of rectifier 15 is connected to a pair of output lines 16, 17 one of which may be grounded. Connected between lines 16, 17 directly at the rectifier 16 is a protective circuit consisting of a capacitor $C_1$ and a thermistor T in series. Thermistor T reduces in resistance as it heats, in terms of its temperature characteristic.

In series on the line 16 is a filter choke L, and following the choke L is a shunt filter capacitor $C_2$. A load, normally an audio power amplifier, is connected in shunt to capacitor $C_2$.

OPERATION

On closing switch 11, the thermistor is assumed cold, and therfore as having high resistance. A surge of current tends to occur into the filter, which for a large load can reach a peak of 500 a. The surge current is limited by the total resistance reflected into primary winding 12. The dominant component of this resistance is supplied by the thermistor while cold, when its resistance is high. The primary current is thus reduced to a safe value.

For the ripple current, the impedance of the inductance L is much higher than the impedance of the series connected capacitor $C_1$ and thermistor T; therefore, the majority of the ripple current will flow through the path $C_1T$. The amount of ripple current flowing through the path $C_1T$ is inversely proportional to the value of the load resistance $R_L$.

It is clear that the ripple voltage between leads 16 and 17 and the DC voltage can be kept nearly constant if in series with the capacitor $C_1$, there is an element which reduces in resistance as the ripple current flow is increased; in this case, the thermistor T. The described circuitry possesses good voltage regulation. Ripple reduction is slightly worse but has no effect due to the presence of the second filter chain (choke L-capacitor $C_2$).

I claim:
1. A surge current reduction circuit for an AC to DC rectification system, comprising
   AC power leads,
   a switch in series with one of said leads,
   a transformer having a primary winding in series with said switch, said transformer having a secondary winding,
   a rectifier connected across said secondary winding,
   a capacitor,
   a thermistor,
   means connecting said capacitor and thermistor in series with each other directly across said rectifier,
   said thermistor having reduced resistance as a function of increasing current therethrough,
   a load,
   means connecting said load across said capacitor and thermistor,
   said thermistor having a sufficiently high resistance when cold to radically reduce surge currents and a sufficient reduction of resistance as a function of ripple current to maintain output voltage approximately constant as a function of load current over a range of output currents.
2. The combination according to claim 1 wherein said circuit element comprises a thermistor.
3. The combination according to claim 1:
   wherein said rectifier means comprises a full-wave rectifier having a pair of input terminals and a pair of output terminals; and
   wherein said input means includes: a transformer having primary and secondary windings, said secondary winding being connected across said pair of input terminals; a pair of AC leads; and a switch connected in series with one of said AC leads and with said primary winding.

References Cited

UNITED STATES PATENTS

| 1,815,141 | 7/1931  | Crouse   | 321—10X |
| 1,984,418 | 12/1934 | Miessner | 321—10  |
| 2,413,033 | 12/1946 | Potter   | 321—10  |
| 2,832,900 | 4/1958  | Ford     | 307—93  |
| 3,047,746 | 7/1962  | Berkery  | 307—93  |
| 3,134,067 | 5/1964  | Ervin    | 317—49X |
| 3,349,313 | 10/1967 | Wilmarth | 321—10  |

OTHER REFERENCES

German printed application 1,090,305, October 1960, 321—11.

WILLIAM M. SHOOP, JR., Primary Examiner

U.S. Cl. X.R.

321—47; 323—81; 333—79